(12) United States Patent
Tedeschi et al.

(10) Patent No.: US 10,737,350 B2
(45) Date of Patent: Aug. 11, 2020

(54) MECHANISM FOR RELEASING ELECTRODE CAPS FROM A SPOT WELDING GUN

(71) Applicant: SINTERLEGHE S.R.L., Turin (IT)

(72) Inventors: Eugenio Tedeschi, Turin (IT); Giuseppe Palopoli, Borgomanero (IT)

(73) Assignee: Sinterleghe S.r.l, Turin (IT)

( * ) Notice: Subject to any disclaimer, the term of this patent is extended or adjusted under 35 U.S.C. 154(b) by 561 days.

(21) Appl. No.: 15/533,363

(22) PCT Filed: Dec. 2, 2015

(86) PCT No.: PCT/IB2015/059288
§ 371 (c)(1),
(2) Date: Jun. 5, 2017

(87) PCT Pub. No.: WO2016/088056
PCT Pub. Date: Jun. 9, 2016

(65) Prior Publication Data
US 2018/0264582 A1  Sep. 20, 2018

(30) Foreign Application Priority Data

Dec. 4, 2014 (IT) .............................. TO2014A1008

(51) Int. Cl.
*B23K 11/30* (2006.01)
*B23K 11/11* (2006.01)

(52) U.S. Cl.
CPC ......... *B23K 11/3072* (2013.01); *B23K 11/115* (2013.01)

(58) Field of Classification Search
CPC .............. B23K 11/115; B23K 11/3072; B23B 31/1612

(Continued)

(56) References Cited

U.S. PATENT DOCUMENTS

| 893,959 A | 7/1908 | Weaver |
| 2,069,527 A * | 2/1937 | Kirkland ............... B23B 31/226 |
| | | 81/53.2 |

(Continued)

FOREIGN PATENT DOCUMENTS

| DE | 3644442 C1 * | 6/1988 | ............. B25B 13/44 |
| DE | 102007007100 A1 | 3/2008 | |

(Continued)

OTHER PUBLICATIONS

15533363_2019-11-12_EP_2639005_A2_I.pdf; EP 2639005-A2_translation2.pdf (Year: 2013).*

(Continued)

*Primary Examiner* — Dana Ross
*Assistant Examiner* — Ket D Dang
(74) *Attorney, Agent, or Firm* — Cittone Demers & Arneri LLP; Henry J. Cittone

(57) ABSTRACT

A mechanism for releasing a pair of electrode caps from a pair of electrode cap holders of a spot welding gun. A rotatable member (11) which can be rotated about an axis (x) has an axially extended through cavity (19) with an inner cylindrical wall in which there are formed two axially spaced sets of niches (20, 21). The niches each have a curved axial wall (20c, 21c) with an eccentric profile relative to the axis of rotation (x). The niches of each set have depths and curvatures progressively increasing in a same circumferential direction. Two sets of gripping rollers (24, 25), partially received in the two sets of niches (20, 21), are provided for gripping two electrode caps (E) on a same welding gun.

6 Claims, 7 Drawing Sheets

(58) Field of Classification Search
USPC ............ 219/86.8, 86.32, 86.1, 86.25, 86.33, 219/86.41, 86.51, 86.61; 279/28, 30, 9.1, 279/71, 2.19, 4.06, 19.2, 19.3, 19.7, 77, 279/81
See application file for complete search history.

(56) References Cited

U.S. PATENT DOCUMENTS

| | | | | |
|---|---|---|---|---|
| 4,892,448 A * | 1/1990 | Hoch | ............... | B23B 5/166 219/119 |
| 5,577,743 A * | 11/1996 | Kanaan | ............... | B23B 31/223 279/72 |
| 8,616,560 B2 * | 12/2013 | Guy | ............... | B23B 31/1177 279/103 |
| 2002/0027329 A1 * | 3/2002 | Schill | ............... | B23B 31/1071 279/71 |
| 2006/0175770 A1 * | 8/2006 | Linzell | ............... | B23B 31/1612 279/71 |
| 2008/0235933 A1 * | 10/2008 | Putt | ............... | F16D 1/096 29/525.01 |
| 2014/0265162 A1 | 9/2014 | Rubens | | |

FOREIGN PATENT DOCUMENTS

| | | | |
|---|---|---|---|
| EP | 2327500 A1 | 6/2011 | |
| EP | 2546018 B1 | 1/2013 | |
| EP | 2639005 A2 * | 9/2013 | ......... B23K 11/3063 |
| EP | 2639005 A2 | 9/2013 | |

OTHER PUBLICATIONS

15533363_2019-11-12_DE_3644442_C1_I.pdf (Year: 1988).*

International Search Report in PCT/IB2015/059288 dated Mar. 10, 2016.

International Preliminary Report on Patentability in PCT/IB2015/059288 dated Dec. 20, 2016.

Written Opinion of the International Searching Authority in PCT/IB2015/059288 dated Mar. 10, 2016.

Database WPI Week 201036 Thomson Scientific, London, GB AN 2010-D07237 XP002743764 Mar. 5, 2010.

* cited by examiner

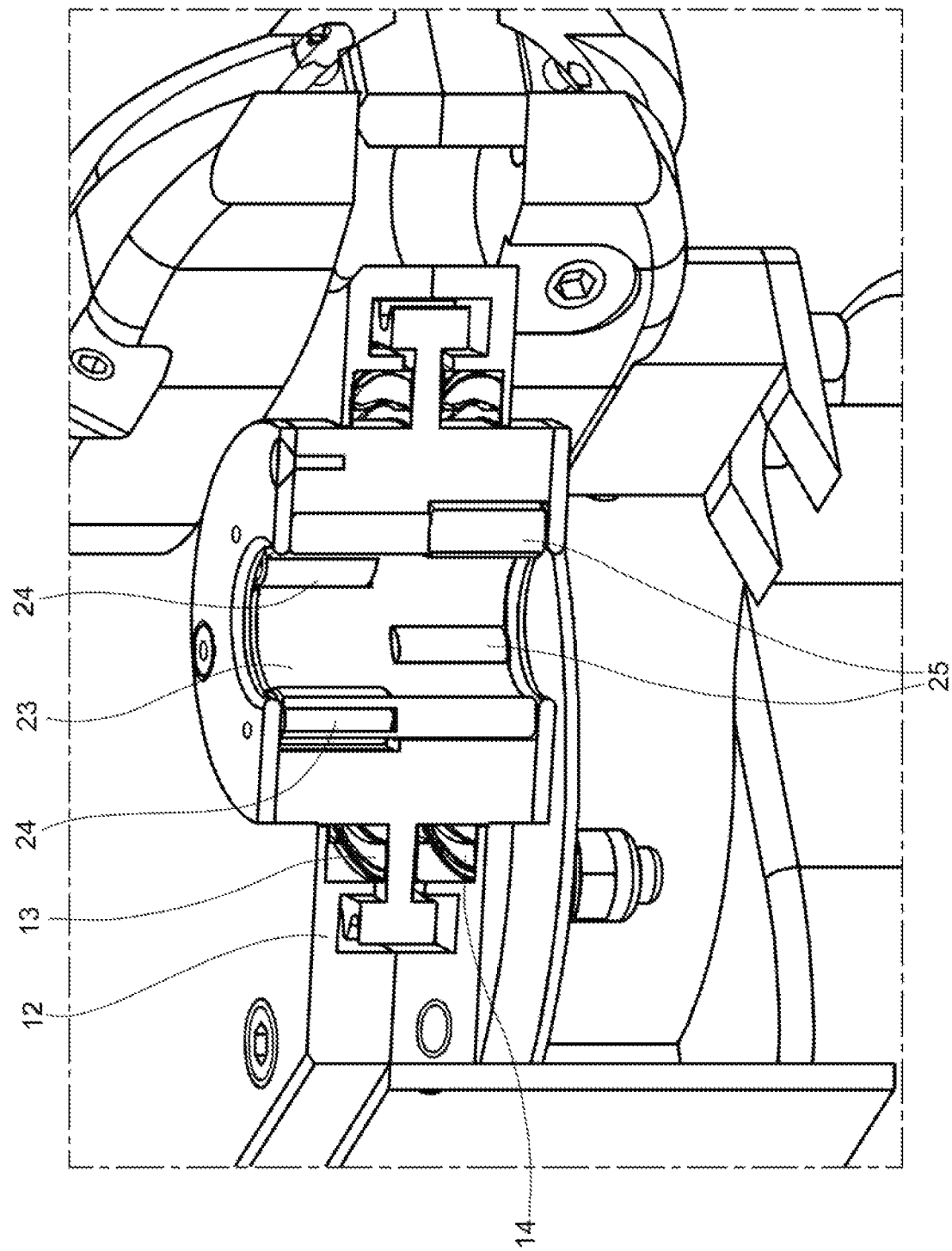

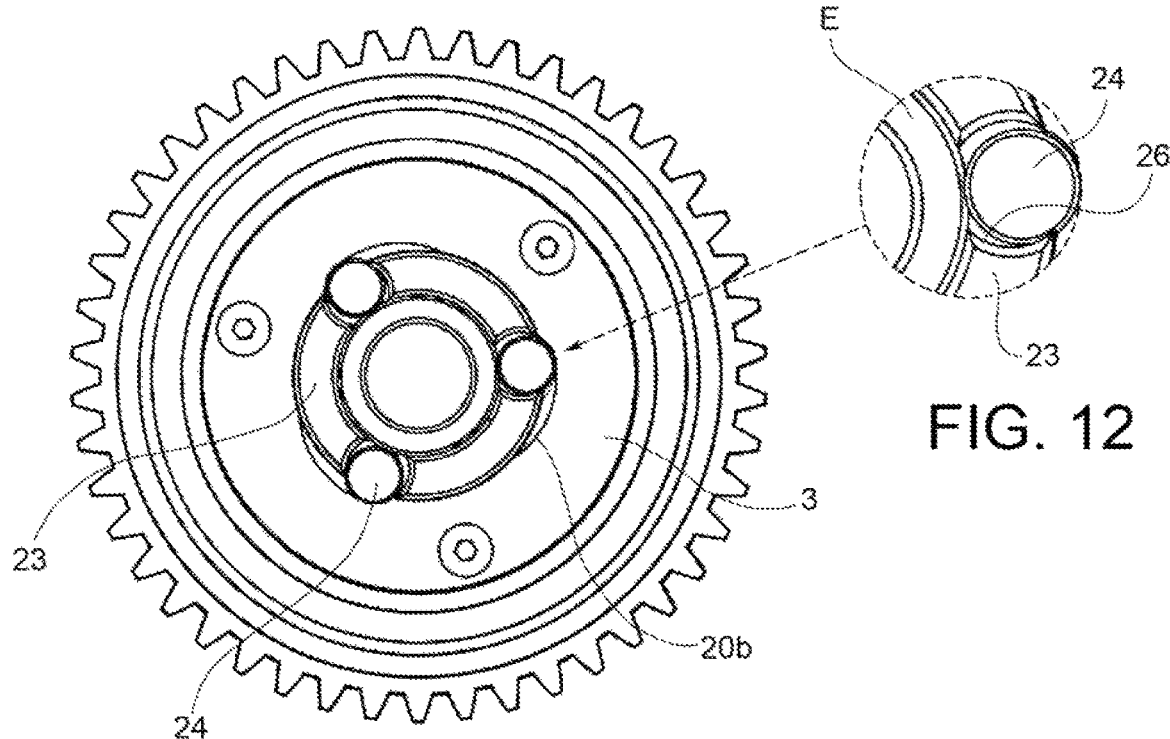
FIG. 11
FIG. 12
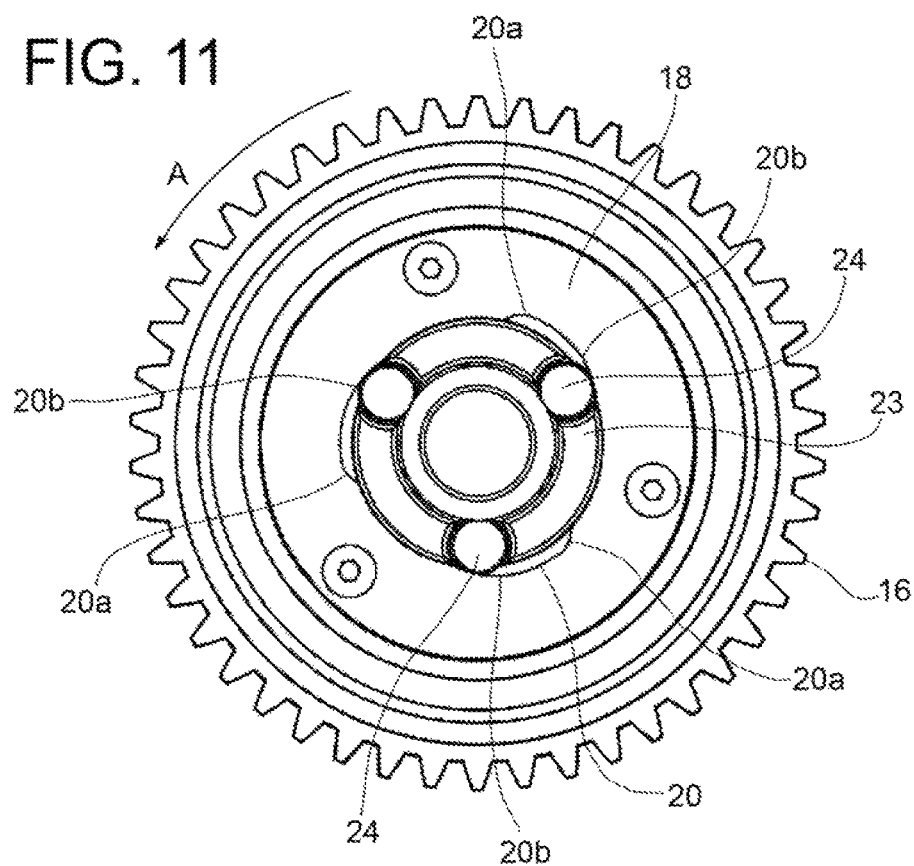
FIG. 13

MECHANISM FOR RELEASING ELECTRODE CAPS FROM A SPOT WELDING GUN

CROSS-REFERENCE TO RELATED APPLICATIONS

This application is the U.S. National Stage of PCT International Patent Application No. PCT/IB2015/059288, filed Dec. 2, 2015, which claims priority to Italian Patent Application No. TO2014A001008, filed Dec. 4, 2014, the disclosures of each of which are incorporated herein by reference in their entirety.

TECHNICAL FIELD

The present invention falls generally within the field of spot-welding performed by automated apparatus. In particular, the invention relates to a mechanism for unlocking worn electrode caps that must be removed from the welding guns of robots and/or by welding guns mounted on the ground.

PRIOR ART

In many production lines, in particular in the field of automobile manufacturing, resistance spot welding is widely used, either using welding guns mounted on robotic arms and/or fixed to the ground. Each welding gun has two opposable electrode caps having a generally convex and cylindrical outer shape. Each electrode cap has a conical recess constituting a seat which allows the capsule to be forcedly mounted on an electrode cap holder of the welding gun. In most cases the electrode cap is forcefully mounted by way of a conical coupling on an electrode holder, which is in turn fixed in the same way to one of the arms of the gun. In other cases, the electrode cap is mounted by means of a threaded coupling to a stem fixed to the electrode-holder arms of the welding gun.

Electrode caps are subject to considerable wear and therefore must be frequently replaced with new ones. The removal of a forcedly mounted electrode cap is carried out by imparting it a rotational movement similar to an unscrewing, as is done for releasing an electrode cap threadedly coupled to the welding gun.

EP 2 327 500 A1 discloses a device to remove electrode caps. The device comprises a removal tool having a rotatable clamping means to grip an electrode cap, a drive unit for the rotation movement of the tool, suction means for the suction of the electrode cap after its removal from the electrode cap holder, and for the suction of a cooling medium emerging from the open end of the electrode cap holder.

Apparatus has been proposed having two removal tools located side by side on a same plane and rotating in respective opposite directions of rotation (clockwise and counterclockwise). The welding robot must be programmed to bring first one of the two electrode caps close to one of the two tools, and then move so as to introduce the second cap in the second tool that imparts an unscrewing motion in a direction opposite to the first.

EP 2 546 018 A1 discloses a device for the removal of electrode caps having a pair of opposing forks having a wedge-shaped profile, each fork having a width corresponding to the thickness of the shank.

IT 1 338 264 discloses an apparatus for the replacement of electrode caps of a spot welding gun. The apparatus includes a mechanism for unlocking an electrode cap from an electrode cap holder of the welding gun. A rotatable member is rotatably controllable about an axis and has a cam-like cavity defining an alternate sequence of lengths that are more eccentric or furthest from the axis of rotation, interspersed with less eccentric lengths, and a set of rollers for gripping the electrode cap received in the cam-shaped cavity. The releasing mechanism can take alternately two operating conditions: a disengaged condition, in which the rotatable member is rotated in a first angular position and the rollers are arranged along the most eccentric sections and are radially spaced from each other to allow introducing between them an electrode cap to be removed from an electrode cap holder of the welding gun; and an engaged condition, in which the rotatable member is rotated to a second angular position and the rollers are arranged along the less eccentric lengths and are tightened radially between these and the cap. Further rotation of the rotatable member, away from the first angular position, causes the cap to unlock from the electrode cap holder.

SUMMARY OF THE INVENTION

It is therefore an object of the invention to speed up and simplify the replacement of electrode caps. Another object of the invention is to remove the caps without damaging the electrode cap carriers. A further object of the invention is to reduce the bulk close to the assembly lines. The above and other objects and advantages, which will appear hereinafter, are achieved according to the invention by a mechanism for unlocking electrode caps having the features described below. Preferred embodiments are also described.

In summary, an releasing mechanism comprises a rotatable member which can be rotated about an axis and has an axially extended through cavity with an inner cylindrical wall. Formed in the inner cylindrical wall are two sets or orders of niches or recesses, aligned in two respective geometric planes, perpendicular to the axis of rotation and axially spaced from one another. The niches each have an axial curved wall with an eccentric profile relative to the axis of rotation. The niches of each set have depths and curvatures increasing progressively in a same circumferential direction. The releasing mechanism further comprises a first and a second set of rollers for engaging a respective one of two electrode caps mounted on a same welding gun. Each roller is partially housed in a respective niche.

In one embodiment, all niches become narrower in a same circumferential direction, to allow for the simultaneous release of two electrode caps. In another embodiment, the niches of one set become narrower in a circumferential direction opposite to the circumferential direction in which the niches of the other set become narrower. This embodiment allows the unlocking of two electrode caps in two successive steps, and is applicable with electrode cap holders screwed to the welding gun.

The releasing mechanism allows to reduce the movements of the welding robot. It allows to eliminate several movements conventionally carried out by a welding gun to move between the two unlocking positions, conventionally spaced form one another, in order to remove each electrode cap from the welding gun. With a single movement, the welding gun reaches the mechanism of the present invention, where both electrode caps can be unlocked and removed simultaneously or in any case without requiring the welding gun to move.

The arrangement of the recesses prevents from applying high clamping forces to electrode caps that do not require it. This will prevent damages at the interface of the conical electrode cap holder, reducing the risk that the taper fit of the electrode caps becomes ineffective and that the caps may come off of the electrode cap holder and remain welded to the sheet metal when the welding gun is working.

BRIEF DESCRIPTION OF THE DRAWINGS

The structural and functional features of a few preferred but not limiting embodiments of an releasing mechanism according to the invention will now be described. Reference is made to the accompanying drawings, in which:

FIG. 3 is a perspective view, in partial cutaway, of the releasing mechanism of FIG. 1;

FIG. 11 is a front view of the releasing mechanism in a first operating position;

FIG. 12 is an enlarged view of a detail of FIG. 11;

FIG. 13 is a front view of the mechanism of FIG. 11 in a second operating position;

DETAILED DESCRIPTION

Figure 1:
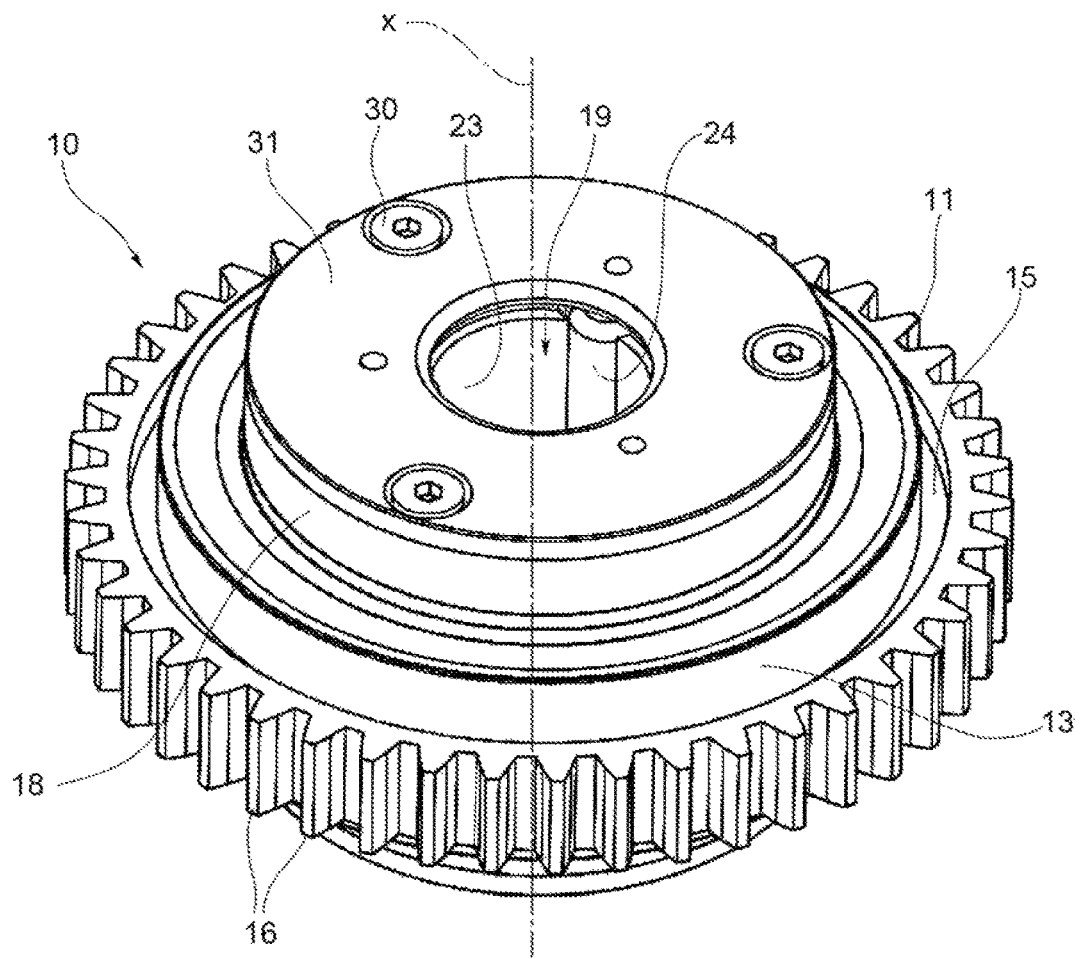
FIG. 1 is a perspective view of a releasing mechanism according to an embodiment of the invention.
Figure 2:
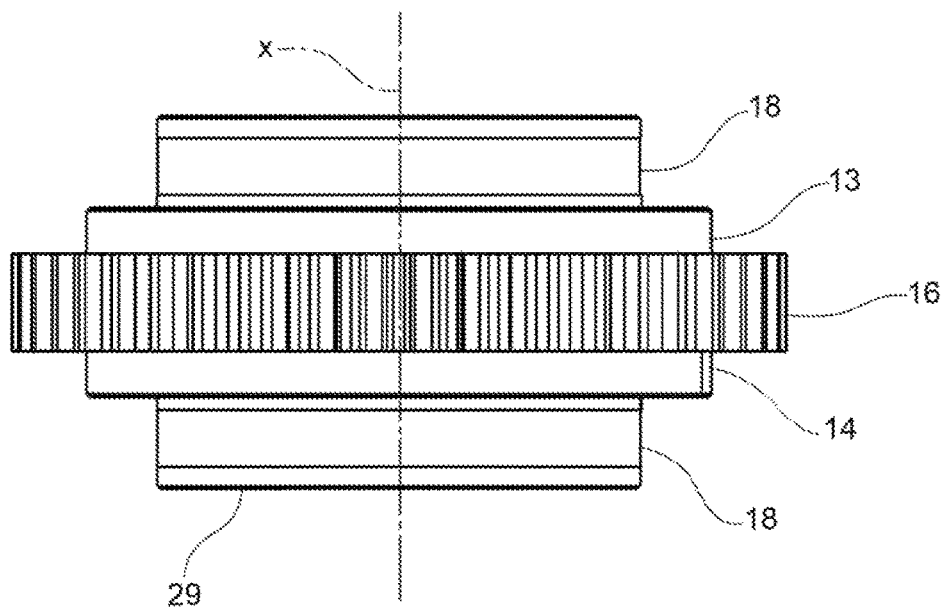
FIG. 2 is a side view of the mechanism of FIG. 1.
Figure 5:
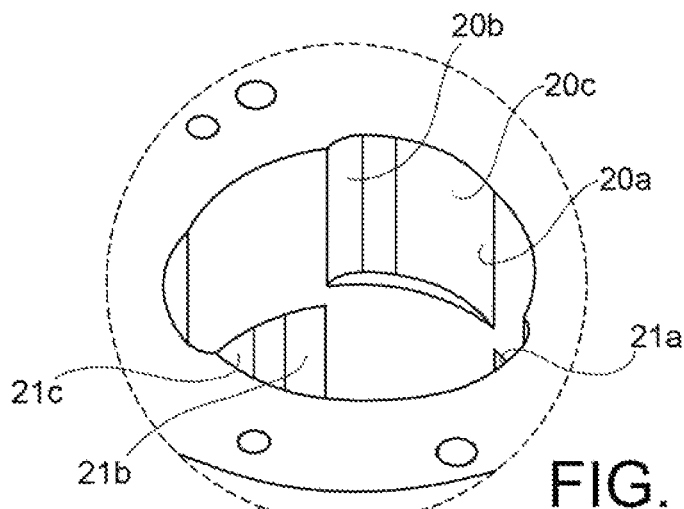
FIG. 5 is an enlarged view of a detail of FIG. 4.
Figure 4:
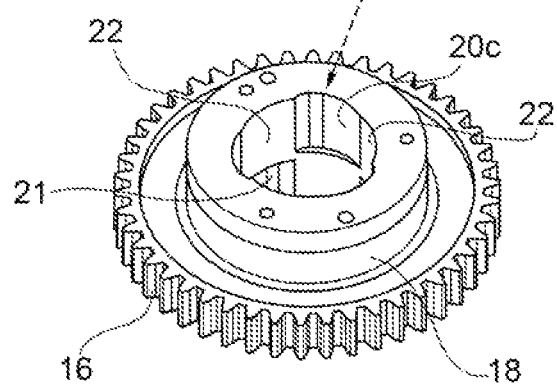
FIG. 4 is a perspective view of a toothed wheel which is part of the mechanism of FIG. 1.

Referring initially to FIG. 1, an unlocking or releasing mechanism, designated as a whole at 10, comprises a rotatable member 11 defining a central axis of rotation x. The rotatable member 11, in this example a gear member, is mountable in a rotatable manner about the axis x with respect to a fixed support 12 through a pair of bearings 13, 14.

The rotatable member 11 forms a sleeve portion 18 and a circular flange 15 extending perpendicularly to the rotation axis x in a transverse mid-plane with respect to the opposite ends of the sleeve 18. The circular flange 15 may provide radially outer peripheral teeth 16. In this context, terms and expressions regarding positions and orientations such as "eccentric", "circumferential", "radial", "axial", "inner" and "outer" are referred to the rotation axis x of the rotatable member 11.

The sleeve portion 18, of generally cylindrical tubular shape, has an inner cavity 19 having an axially extended inner cylindrical wall in which there are formed two axially spaced sets of eccentric niches or recesses 20, 21. Each set of niches comprises a plurality of eccentric niches, three in this example, spaced from one another by cylindrical portions 22. The niches 20, 21 each have a respective axially extending curved wall 20c, 21c having a profile which is eccentric with respect to the axis of rotation x. Furthermore, the niches of each set lie in a same radially or transversely extending geometric plane, perpendicular to the axis of rotation x.

Figures 8, 9, 10:
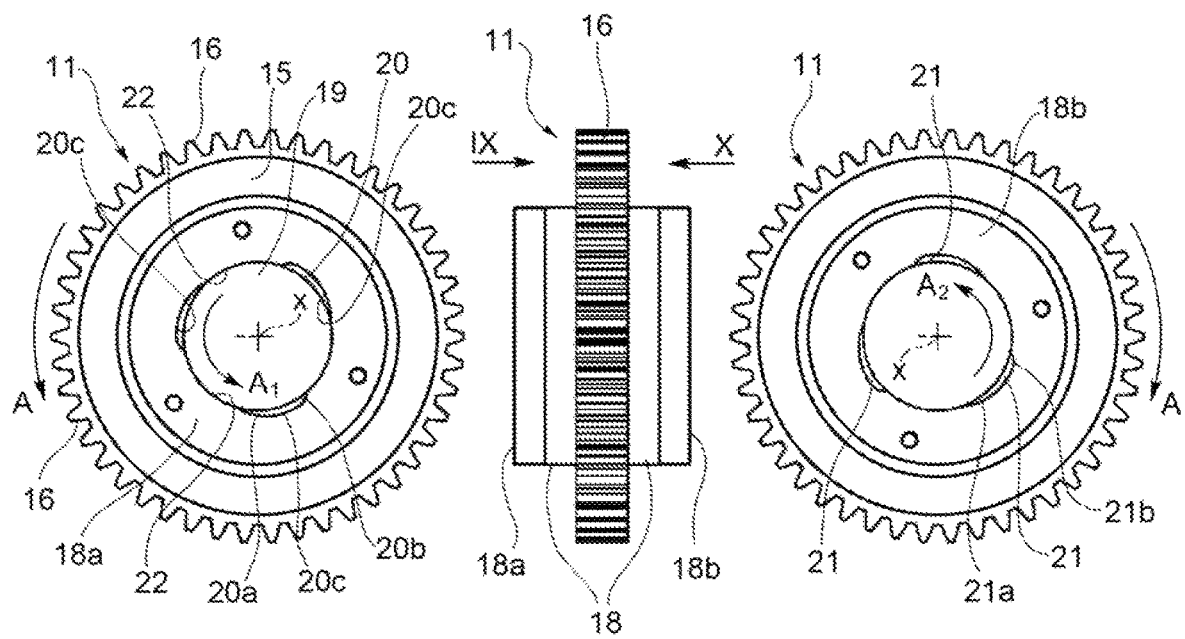
FIG. 8 is a side view of a toothed wheel member of the mechanism of FIG. 1.
FIG. 9 is a view according to arrow IX in FIG. 8.
FIG. 10 is a view according to arrow X in FIG. 8.

The cavity 19 is advantageously an axially through-cavity, which opens on two axially opposite faces 18a, 18b of the sleeve portion 18, visible in FIGS. 9 and 10.

The recesses or niches of each series have depths and curvatures progressively increasing in a same circumferential direction.

Each niche therefore provides a first end 20a, 21a, less deep (i.e. closer to the x axis) and less curved, adjacent to a first cylindrical portion 22, and a second end 20b, 21b, deeper (i.e. farther away from the x axis) and more curved, adjacent to a second cylindrical portion 22 next to and spaced circumferentially from the first cylindrical portion.

In other words, in the circumferential direction along the inside of the cavity 19, at the level of each set of niches, there is provided a alternating sequence of more eccentric, recessed surfaces having a greater curvature, separated by cylindrical surfaces 22 being less eccentric and having a lesser curvature, i.e. closer to the central axis x of rotation of the rotatable member 11.

Received with some amount of radial play in the cavity 19 is a retaining cage 23 adapted to retain two sets of rolling elements 24, 25, in this example rollers, equally spaced from one another. Each roller is partially housed in a respective recess 20, 21, adjacent to the wall of that recess. The rolling elements 24, 25 serve as gripping elements for clamping a worn electrode cap and release it from the electrode cap holder (not shown) on the welding gun.

The cage 23 provides two axially spaced series of pockets 26, 27, each adapted to retain a respective roller circumferentially spaced from another roller of the same set.

In one embodiment, each pocket has a radial abutment surface 28 that prevents the roller come into contact with the other rollers of the same releasing mechanism.

Figure 6:
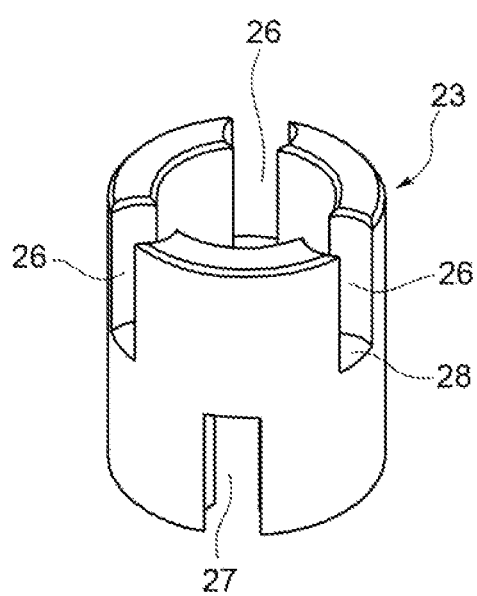
FIG. 6 is a perspective view of an internal component of the mechanism of FIG. 1.
Figure 7:
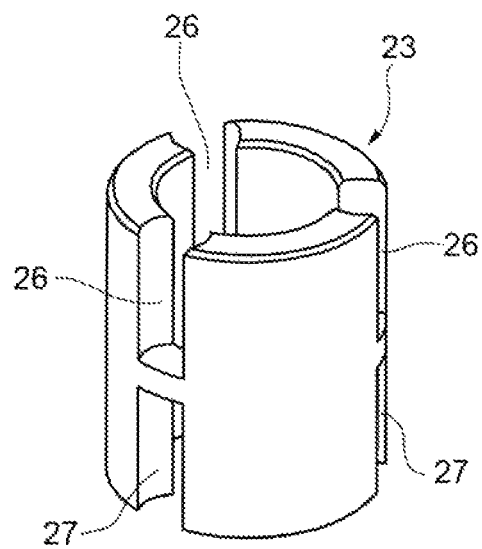
FIG. 7 is a perspective view of an alternative embodiment of the component of FIG. 6.
Figure 17:
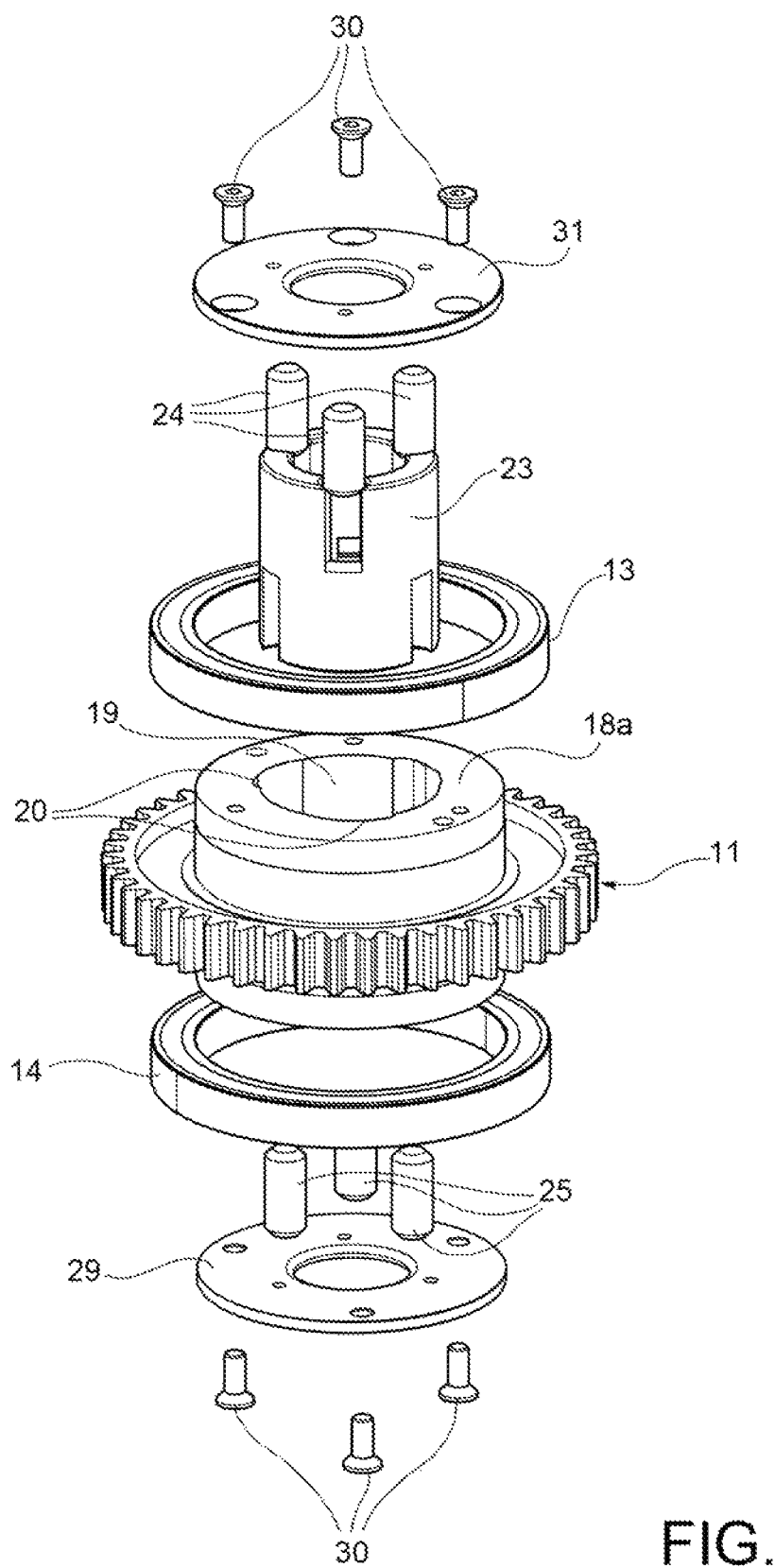
FIG. 17 is an exploded view of a releasing mechanism that includes the component of FIG. 6.
Figure 18:
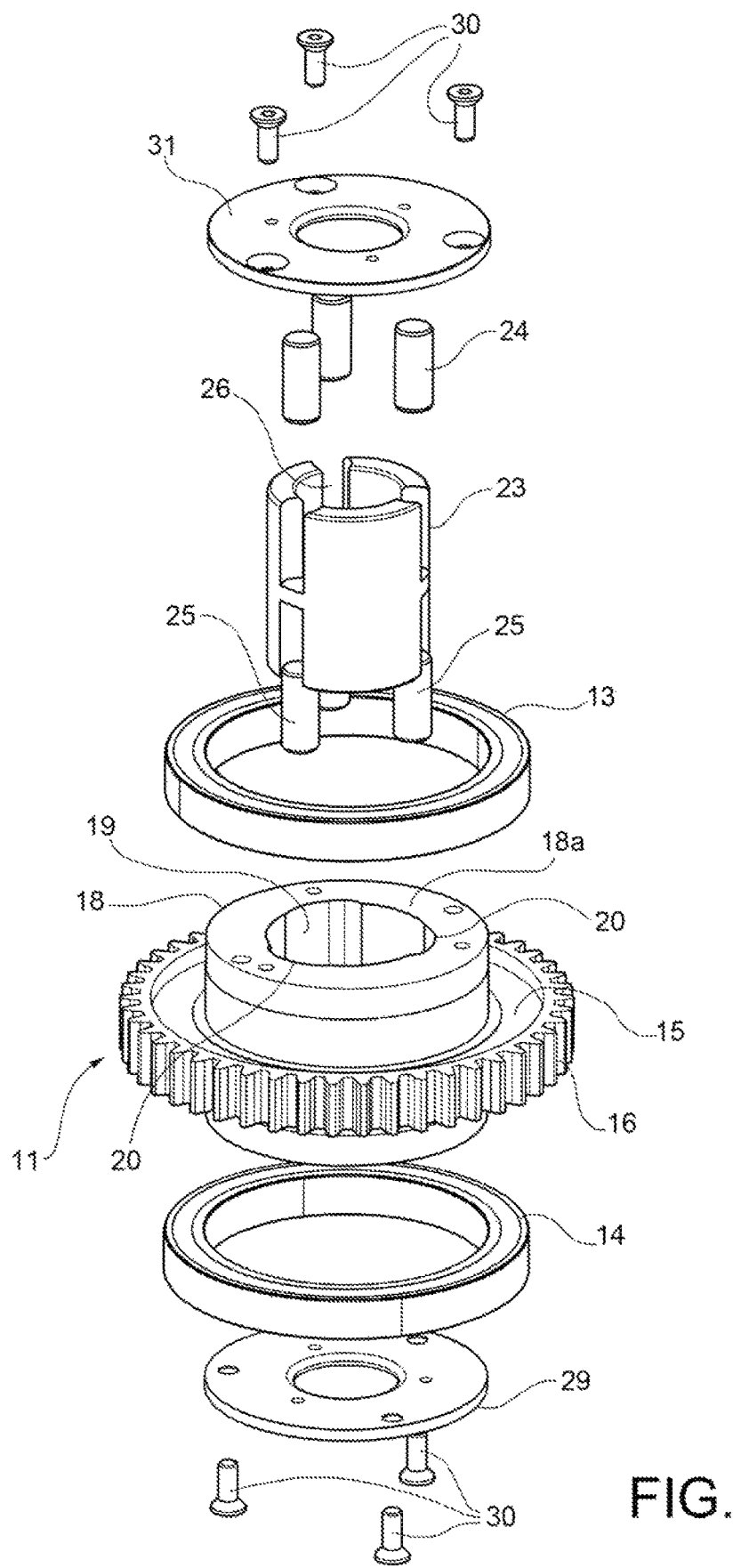
FIG. 18 is an exploded view of a releasing mechanism including the component of FIG. 7.

In the embodiments illustrated herein, the two sets of pockets are formed between two respective pluralities of axial arcuate walls. The pockets each have a having a radial thickness or depth which is less than the diameter of the rollers. In the embodiment of FIG. 6, the pockets 26 of one set are axially staggered with respect to the pockets 27 of the other set. In the embodiment of FIG. 7, the pockets 26 of one set are axially aligned with the pockets 27 of the other set. FIGS. 17 and 18 show exploded views of releasing mechanisms that use respectively a cage according to FIG. 6 and FIG. 7. In order to retain the rollers 24, 25 axially, two annular end discs 29, 31 may for example be fixed at the opposite axial ends of the sleeve portion 18 by means of screws 30 or other fasteners.

The number of rolling elements may vary. In the exemplary embodiments illustrated herein, two sets are shown, each set comprising three rolling elements. In other embodiments, more than two sets may be provided, and/or more than three rolling elements may be provided in one or more sets. As an alternative to rollers, the rolling elements may be balls.

In order to remove a pair of worn electrode caps from a welding gun of a robot (not shown), the robot will move its own welding gun in the vicinity of the releasing mechanism 10. The welding gun then closes, introducing both electrode caps from axially opposite sides into the cavity 19. In FIGS. 11 and 12, designated at E is one of the two electrode caps, inserted into the cavity 19 from the side of face 18a. More particularly, the electrode cap is inserted in the space defined between the rollers 24 and the cage 23. As the electrode cap enters the cavity 19, it moves the rollers 24 circumferentially toward the deeper and more curved ends 20a of the first set of recesses 20. The same happens on the opposite side, where the introduction of the other electrode cap in the cavity 19 from the side of face 18b causes the rollers 25 to move circumferentially towards the deeper and more curved ends 21b of the second set of recesses 21.

To operate the releasing mechanism an actuator (not shown) can be used, such as a rack and pinion mechanism or a gear which engages with the teeth 16 and causes the toothed rotatable member 11 to rotate about the rotation axis x. The rotation of cavity 19 in the direction of rotation indicated by arrow A (FIG. 13) causes a relative displacement of the rollers 24 with respect to the cavity 19. The releasing mechanism moves from the angular position of FIG. 11 to the angular position of FIG. 13. The rollers 24 move progressively from the deeper and more eccentric ends 20b toward the less deep and less eccentric ends 20a of the niches 20, until the rollers 24 remain radially clamped between the cylindrical side surface of the electrode cap E and the niches 20. By continuing the rotation of the rotatable member 11 and the cavity 19, the rollers 24 clamp the electrode E and drive it for rotation together with the rotatable member 11. Thus, the taper fit or conical coupling between the electrode and the electrode cap holder of the welding gun (not shown) is released.

The releasing mechanism is capable of causing both of the electrode caps of a same welding gun to release, without having to move the welding gun further, once the gun has been closed on the mechanism 10.

According to one embodiment, shown in FIGS. 8-10 the two electrode caps of a welding gun are released one at a time, into two subsequent steps. Arrow A in FIG. 9 indicates the direction of rotation that may be imparted to the rotatable member 11 to cause the clamping of the rollers 24 on the first electrode cap and subsequently the unclamping of this cap from the electrode cap holder of the welding gun. On the side visible in FIG. 9, indicated at A1 is the circumferential direction in which the recesses 20 of the first set widen, passing from the shallower ends 20a towards the deeper ends 20b.

On the side visible in FIG. 9, the direction of rotation A of the rotatable member 11 is concordant with the direction A1 of enlargement of the niches 20, whereas on the opposite side (FIG. 10), the direction of rotation A is discordant with the circumferential direction A2 according to which the niches of the second set 21 widen, passing from the shallower ends 21a towards the deeper ends 21b. In other words, the niches 20 of the first set have depths and curvatures that increase progressively in a same first circumferential direction, while the recesses 21 of the second set have depths and curvatures that increase progressively in a same second circumferential direction, opposite the first circumferential direction. As a result of this arrangement, when the rotatable member 11 is rotated in the direction of rotation A, the rollers 24 of the first set are lead towards the less deep ends 20a of the niches 20, radially tightening the first electrode cap. At the same time, the rollers 25 of the second set will simultaneously move to the deeper ends 21b of the recesses 21, without causing rotation of the second electrode cap. The reverse occurs if the rotatable member is rotated in the direction opposite to the direction of rotation A. Hence, the rotation of the rotatable member 11 of FIGS. 8-10 in any one of the two directions of rotation will causes the clamping, and thereafter the release, of only one of the two electrode caps. To unlock both caps, it is necessary to rotate first the rotatable member 11 of FIGS. 8-10 a first direction of rotation, and then in the reverse direction.

The above-mentioned opposite orientation of the two sets of niches allows for the unlocking, in two successive steps, of two electrode caps mounted on two respective electrode cap holders of a same welding gun. This applies both to electrode cap holders of the type mounted with a forced or conical coupling (taper fit) on the relative arms of the welding gun, and also for electrode cap holders threadedly mounted (screwed) to the welding gun. In the latter mode, the rotation imparted to the rotatable member will be concordant with the screwing direction of the electrode-holder on the respective arm of the welding gun. The imparted rotation will not cause the unscrewing of the electrode cap holder from the welding gun.

Figures 14, 15, 16:
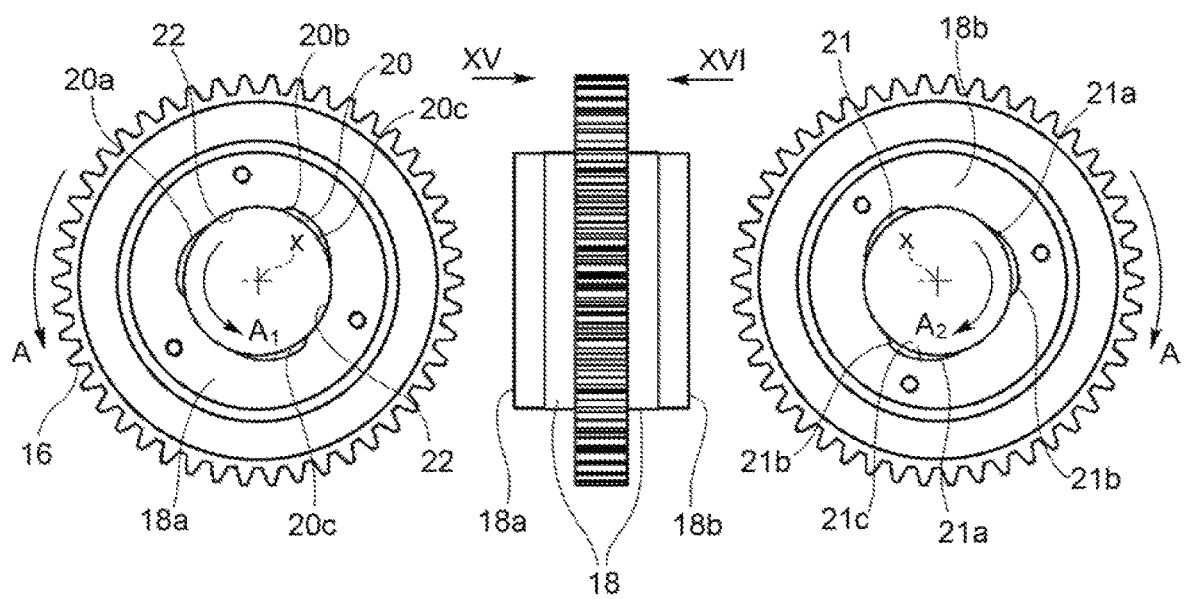
FIG. 14 is a side view of an alternative embodiment of an toothed wheel member which is part of the mechanism of FIG. 1.
FIG. 15 is a view according to arrow XV in FIG. 14.
FIG. 16 is a view according to arrow XVI in FIG. 14.

Another embodiment, shown in FIGS. 14-16, allows to unlock simultaneously, in a single step, both of the electrode caps mounted on the two arms of a welding gun through a tight fit or a taper fit. All the recesses 20 and 21, both of the first and both of the second set, have depths and curvatures progressively increasing in one and the same circumferential direction.

Arrow A in FIG. 15 indicates the direction of rotation that, when imparted to the rotatable member 11, causes the clamping of the rollers 24 on the first electrode cap and subsequently the release of this caps from the supporting shank of the welding gun. On the side shown in FIG. 14, indicated at A1 is the circumferential direction in which the recesses 20 of the first set widen, passing from the shallower ends 20a towards the deeper ends 20b. On the side visible in FIG. 14, a direction of rotation A of the rotatable member 11 is concordant with the direction A1 of enlargement of the niches 20. Also on the opposite side (FIG. 16), the direction of rotation A is concordant with the circumferential direction A2 of enlargement of the niches 21 of the second set, passing from the shallower ends 21a towards the deeper ends 21b. As a result of this arrangement, when the rotatable member 11 is rotated in the direction of rotation A, both by the rollers 24 of the first set as well as the rollers 25 of the second set are moved towards the shallower ends 20a, 21a of the niches 20, 21, thereby radially tightening the two electrode caps. If the rotatable member 11 is rotated in the opposite direction to the rotation direction A, both by the rollers 24 of the first set and the rollers 25 of the second set will move towards the deeper ends 20b, 21b of the niches 20, 21, without tightening the electrode caps and without making them rotate.

Thus, the tightening of both electrode caps may be accomplished by rotating a rotatable member 11 according to FIGS. 14-16 in one only of the two possible directions of rotation.

The embodiment of FIGS. 14-16 provides two sets of niches with curvatures and depths increasing in a same circumferential direction of rotation. This embodiment is applicable for releasing two electrode caps from electrode cap holders mounted with a taper fit or tight fit to the arms of a welding gun. This embodiment is not suitable for electrode cap holders threadedly mounted to the welding gun, since the simultaneous rotation of both capsules in a same direction would unscrew one of the electrode cap holders from the arm of the welding gun.

After unlocking, the electrode caps fall by gravity into a container.

It will be appreciated that the releasing mechanism is self-adaptive. As known, the torque necessary to release the electrode caps is variable from time to time, as a function of the closing force that was applied during assembly and the degree of oxidation achieved at the interface between the electrode cap and the conical shank of the electrode cap holder. This releasing mechanism applies to each electrode cap a radial clamping force substantially proportional to the requested unlocking torque. High clamping forces will therefore be applied only to the electrode caps requiring a high unlocking torque. Electrode caps mounted with a moderate force or non-oxided (not rusted) may be unlocked by applying a moderate radial clamping force. This prevents the majority of the electrode caps from being applied an excessively high radial clamping force, which could damage the surface of the conical interface of the electrode cap carrier. The programming times and the required movements of the welding robot are reduced because with the releasing mechanism of this disclosure the welding robot is required to perform only a movement along the x axis to introduce the caps coaxially within the releasing mechanism. No subsequent, additional movement of rotation is required. Finally, a single workstation fir unlocking of both electrode caps reduces the overall dimensions and makes the mechanism flexible to install more flexibly in weld lines at the most convenient locations, for example near a dressing device.

Various aspects and embodiments of the invention have been described. It is understood that each embodiment may be combined with any other embodiment. For example, a rotatable member 11 in accordance with the embodiment illustrated in FIGS. 8-10, or according to FIGS. 14-16, may be used with a cage according to FIG. 6 or FIG. 7. In other embodiments (not illustrated), the rotatable member 11 may be a wheel without peripheral teeth, for example to be driven by a belt or by a another type of drive. In other embodiments (not illustrated), the rotatable member may be a lever articulated to a driving connecting rod. Furthermore, the invention is not limited to the embodiments described but may be varied within the scope defined by the appended claims.

The invention claimed is:

1. A mechanism for releasing a pair of electrode caps from a respective pair of electrode cap holders of a spot welding gun, the mechanism comprising:
   a rotatable member drivable for rotation about an axis (x) and having an axially extending internal cavity with an inner cylindrical wall in which there are formed a first set of niches and a second set of niches axially spaced from the first set of niches, the niches of the first set of niches and of the second set of niches each having a curved axial wall with an eccentric profile with respect to the axis of rotation (x), and wherein the niches of the first set of niches have depths and curvatures progressively increasing in a same first circumferential direction, whereas the niches of the second set of niches have depths and curvatures progressively increasing in a same second circumferential direction opposite to the first circumferential direction,
   a first set of gripping rolling elements and a second set of gripping rolling elements for gripping a respective first electrode cap and a respective second electrode cap, wherein each gripping rolling element of the first set of gripping rolling elements is partially housed in a respective niche of the first set of niches and each gripping rolling element of the second set of gripping rolling elements is partially housed in a respective niche of the second set of niches,
   wherein the niches of the first set of niches and the niches of the second set of niches are separated by lengths of cylindrical wall, each niche having a first less deep and less curved end adjacent to a length of cylindrical wall, and a second, deeper and more curved end adjacent to another length of cylindrical wall,
   wherein the rotatable member is capable of alternatively reaching two angular positions around the axis of rotation:
   a first angular position, in which the rolling gripping elements of the first set of gripping rolling elements are located adjacent to the second, deeper and more curved ends of the first set of niches, whereas the gripping rolling elements of the second set of gripping rolling elements are located adjacent to the first, less curved and less deep ends of the niches of the first set of niches; and
   a second angular position, rotated with respect to the first angular position, in which the gripping rolling elements of the second set of gripping rolling elements are located adjacent to the second, more curved and deeper ends of the niches of the second set of niches, whereas the gripping rolling elements of the first set of gripping rolling elements are located adjacent to the first, less curved and less deep ends of the niches of the first set of niches.

2. The releasing mechanism according to claim 1, comprising a retaining cage accommodated with radial play in the axially extending internal cavity, the cage having two axially spaced sets of pockets, each pocket retaining one of the gripping rolling elements of the first or the second set circumferentially spaced from the other rolling elements of the same set and partially housed in a respective niche.

3. The releasing mechanism according to claim 2, wherein the pockets of a set are axially staggered with respect to the pockets of the other set.

4. The releasing mechanism according to claim 2, wherein the pockets of one set are axially aligned with the pockets of the other set.

5. The releasing mechanism according to claim 1, wherein the gripping rolling elements are rollers.

6. The releasing mechanism according to claim 1, wherein the rotatable member comprises:
   a central sleeve portion providing the axially extending internal cavity and two axially opposite faces on which said axially extending internal cavity opens,
   a circular flange which extends radially outwardly from the central sleeve portion, and
   a radially outer surface formed on the circular flange for engaging an actuating device for causing rotation of the rotatable member about the axis of rotation (x).

* * * * *